T. CLEMENS.
VEHICLE RUNNING GEAR.
APPLICATION FILED DEC. 19, 1914.
1,174,392.
Patented Mar. 7, 1916.
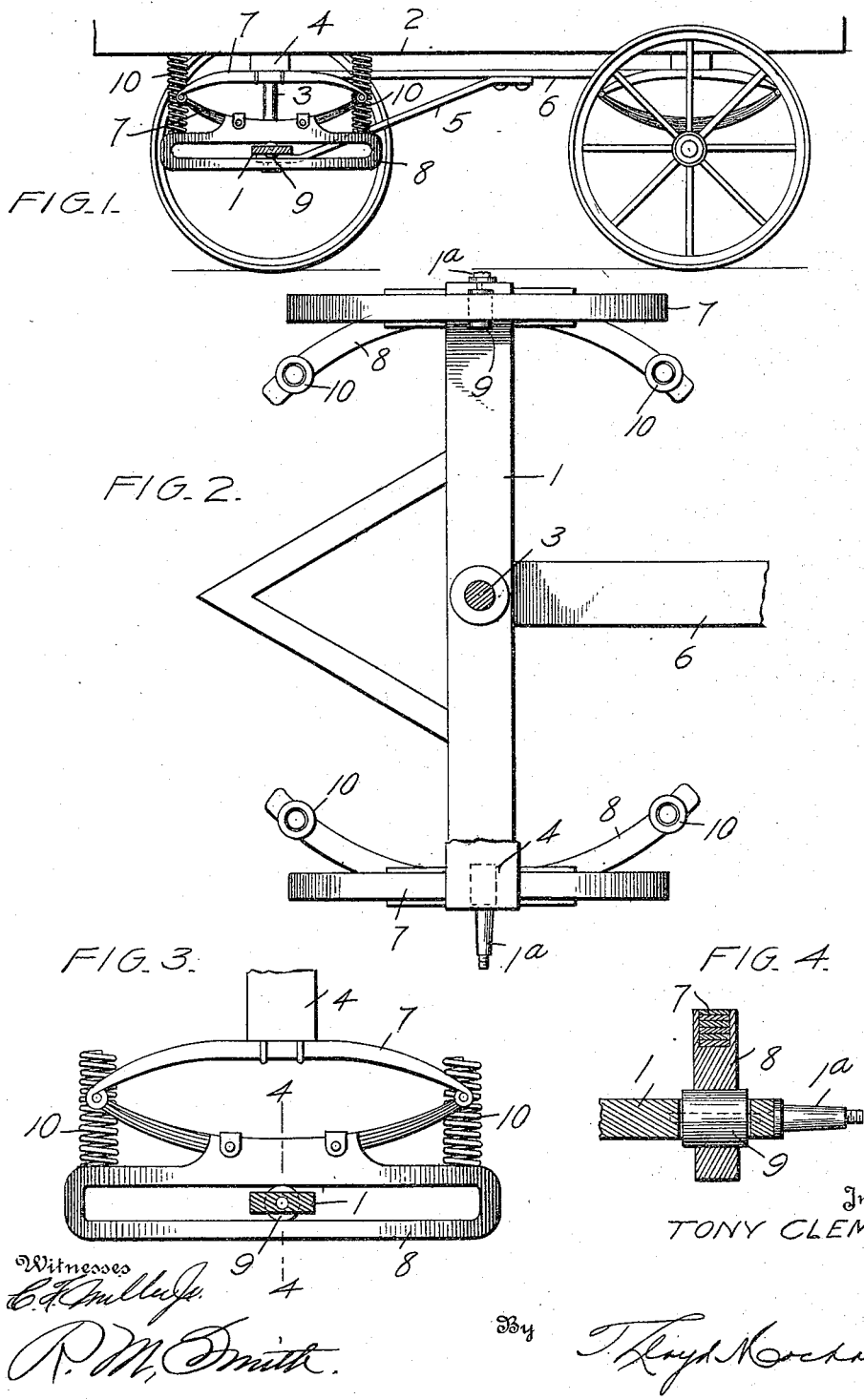

UNITED STATES PATENT OFFICE.

TONY CLEMENS, OF BIGBEE VALLEY, MISSISSIPPI.

VEHICLE RUNNING-GEAR.

1,174,392.  Specification of Letters Patent.  Patented Mar. 7, 1916.

Application filed December 19, 1914. Serial No. 878,126.

*To all whom it may concern:*

Be it known that I, TONY CLEMENS, a citizen of the United States, residing at Bigbee Valley, in the county of Noxubee and State of Mississippi, have invented certain new and useful Improvements in Vehicle Running-Gears, of which the following is a specification.

This invention relates to improvements in vehicle running gears.

The object of the present invention is to provide a safeguard for the forward portion of the gear to prevent the sudden twisting of the front axle and reduce to a minimum the danger of breaking the king bolt.

Another object is to provide a device of the class specified, which, in the event of the breaking of the king bolt, the front axle will be held beneath the vehicle thereby maintaining said vehicle in its normal position.

A still further object is to provide a gear in which the turning of the front axle will be limited to prevent the vehicle from making too short a turn with the possibility of upsetting.

With these and other objects in view, the invention consists of an axle pivoted upon a central or king bolt, arc-shaped guides carried by springs and receiving the ends of said axles and anti-friction rollers mounted in said axles to travel in said guides.

In the drawings:—Figure 1 is a side elevation of a vehicle running gear embodying the invention. Fig. 2 is an enlarged sectional plan of the forward part of said gear. Fig. 3 is an enlarged side elevation of the subject matter of Fig. 2, the axle being shown in section, and Fig. 4 is an enlarged section on the line 4—4 of Fig. 3.

While the invention is shown in Fig. 1 as applied to a wagon, it can, of course, with minor changes, be applied to other classes of vehicles.

In carrying out the invention, the front axle 1 is pivoted to the body 2 of the vehicle by a king bolt 3. This bolt passes through the bolster 4 and axle 1 and has its lower end engaged by a diagonal brace 5 which is in turn secured to the reach 6. Secured adjacent the ends of the bolster 4 by any preferred means is a spring 7, preferably of the form shown, the underside of said spring having attached thereto the arcuate guide and retaining members 8. These members 8 are slotted as shown and the ends of the axle 1 pass therethrough, the spindles 1ª of said axle traveling upon the outer side of said members. Rollers 9 are mounted within the ends of the axle and travel within the members 8, the members being formed on an arc with the king bolt as the center as shown in Fig. 2. This enables the rollers to travel always within the slot of the said members and allows the vehicle to make a comparatively short turn.

In order to effectually support the ends of the members 8 and at the same time secure the desired resiliency, auxiliary springs 10 are mounted upon these ends and secured to the underside of the vehicle. These springs may be of the coil type as shown or some other form substituted.

From the foregoing description, taken in connection with the accompanying drawings, it will be seen that I have provided a gearing for the front part of a vehicle in which the axle is effectually held and guided while at the same time maintaining the maximum resiliency.

I claim:—

1. A vehicle gearing comprising a pivoted axle, horizontally disposed stationary guide members surrounding each end of said axle and springs interposed between said guide members and said vehicle.

2. A vehicle gearing comprising a pivoted axle, slotted arcuate guiding and limiting members supporting the ends of said axle springs securing said members to the vehicle body, and anti-friction rollers carried by said axle.

In testimony whereof I affix my signature in presence of two witnesses.

TONY $\underset{\text{mark}}{\overset{\text{his}}{\times}}$ CLEMENS.

Witnesses:
JOHN R. LEE,
BENNETT S. JONES.

Copies of this patent may be obtained for five cents each, by addressing the "Commissioner of Patents, Washington, D. C."